Nov. 4, 1930.    R. R. DUNLOP    1,780,703
ELECTRIC CONTROLLER
Filed June 8, 1923    3 Sheets-Sheet 2

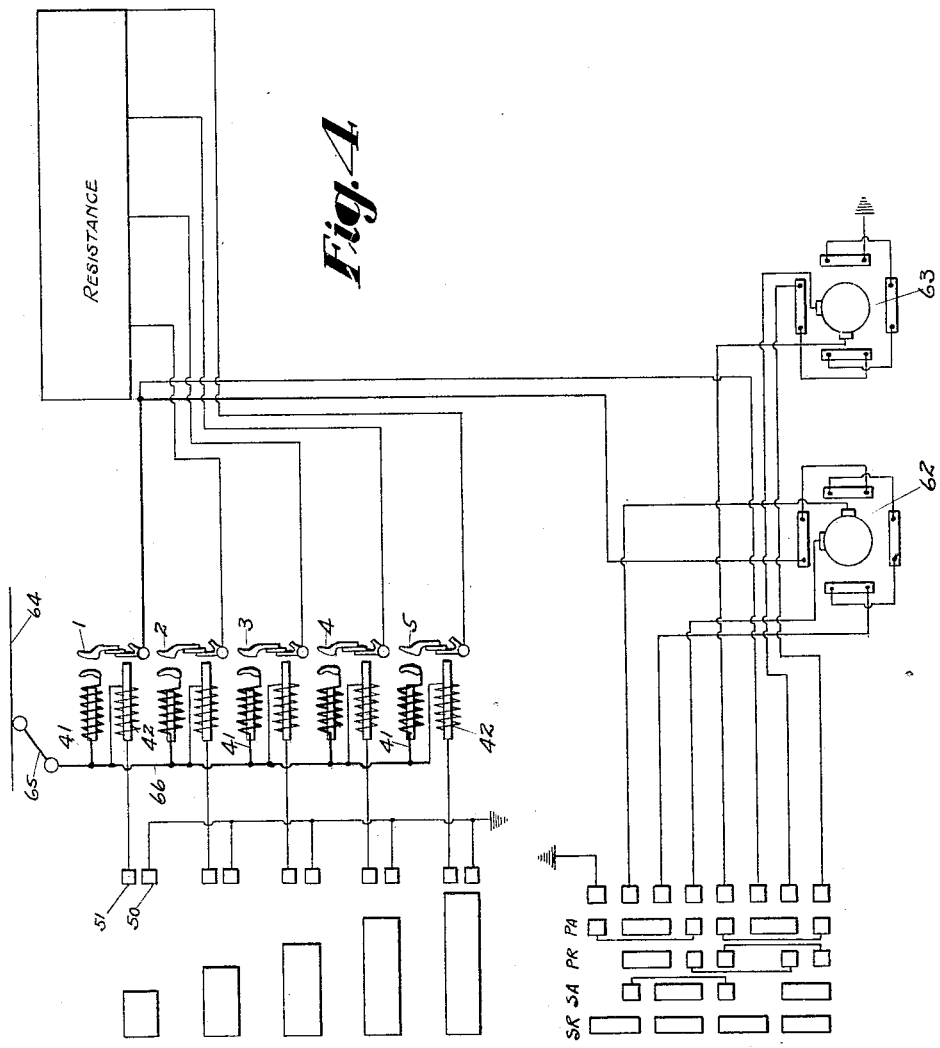

Patented Nov. 4, 1930

1,780,703

UNITED STATES PATENT OFFICE

ROBERT R. DUNLOP, OF COLUMBUS, OHIO, ASSIGNOR TO THE JEFFREY MANUFACTURING COMPANY, OF COLUMBUS, OHIO, A CORPORATION OF OHIO

ELECTRIC CONTROLLER

Application filed June 8, 1923. Serial No. 644,179.

The present invention relates to certain new and useful improvements in electric controllers of the class adapted for use upon electric locomotives to connect the motors of said locomotives with a source of electric supply, and to include more or less resistance in the circuits of said motors to regulate the flow of current therethrough.

As heretofore constructed the contact members whereby the various conductors of an electric locomotive are connected with a source of electric supply have been subject to injury by destructive arcing resulting from retardation of their movement from closed circuit to open circuit position caused by improper manipulation of the operating handle.

It is the especial object of this invention to provide, in a controller of the class described, mechanically actuated circuit closing devices with automatically acting opening mechanism combined with electrically actuated locking means whereby premature operation of said opening mechanism is prevented and a quick break is insured between the contact elements of the controller.

The means whereby I attain this object are fully set forth in the following specification and illustrated in the accompanying drawings of which—

Fig. 4 is a diagram illustrating the electrical connections of a two motor locomotive equipped with the devices of my invention.

Like numerals refer to similar parts in the several figures.

Figure 1:
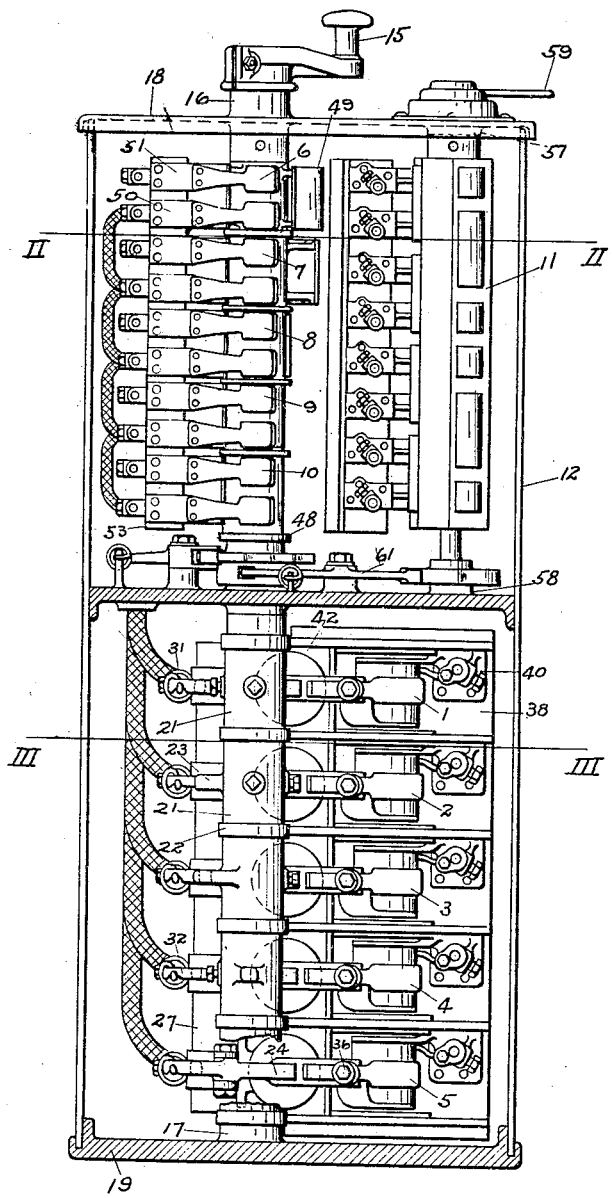
Fig. 1 is a front elevation of the preferred embodiment of my invention, the cover being removed to reveal the operative parts.

The preferred embodiment of my invention comprises a plurality of main circuit closing switches 1, 2, 3, 4, and 5, arranged to connect the motors of a locomotive with a source of electric supply through more or less resistance, a corresponding number of supplemental switches 6, 7, 8, 9, and 10, adapted to control the actuation of electro-magnetic holding devices arranged to prevent premature opening of said main switches, and a reversing switch mechanism 11 to control the direction of the motors. All of these devices are enclosed in a suitable casing 12 having a removable cover 13 such as is commonly provided for the protection of apparatus of this character. Mounted in the casing 12 is a shaft 14 upon which are mounted the actuating devices of the main and supplemental switches and this shaft is provided with an operating handle 15 outside of the casing convenient to the hand of the operator, by movement of which the switches may be manipulated in the manner to be hereinafter fully disclosed.

The shaft 14 is square throughout the greater part of its length, being round only where it extends through the journal bearings 16 and 17 in the top plate 18 and bottom plate 19 respectively of the casing. Mounted upon the lower portion of the shaft 14, and insulated therefrom by an insulating sleeve 20, are a plurality of hubs 21, one for each of the main circuit closing switches, and these hubs are separated from each other by suitable insulating washers 22. As the main circuit closing switches are all alike a description of one will apply to all.

Figure 3:
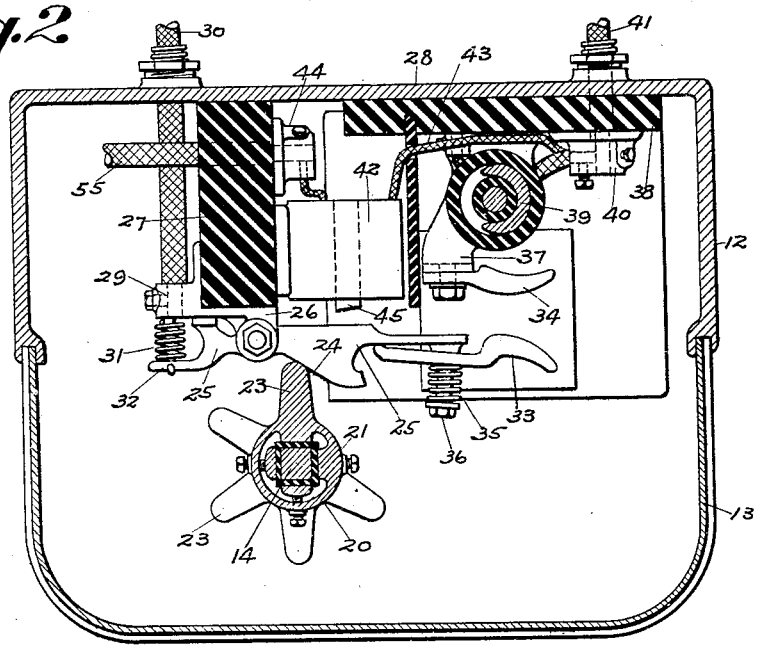
Fig. 3 is a cross sectional view taken along the line III—III of Fig. 1.

As shown particularly in Fig. 3 of the drawings, each of the hubs 21 is provided with a radially projecting finger 23 adapted to contact with the cam surface 24 of a switch blade 25 in such manner that, when the shaft 14 is rotated, the blade 25 will be moved to the circuit closing position. The blade 25 is pivoted upon a supporting base 26 which is mounted upon an insulating foundation 27 attached to the back wall 28 of the casing. The base 26 is provided with a binding post 29 by which it is electrically connected with the conductor 30 of the locomotive wiring system. A tension spring 31 extending between the supporting base 26 and the arm 32 of the switch blade, tends to maintain the blade 25 in the circuit open position.

Loosely mounted upon the blade 25 is a contact finger 33 which is adapted to contact with a similar contact member 34 to form an electric connection therewith. The finger 33 is resiliently held in operative relation with the blade 25 by a compression spring 35 which abuts against the head of the machine screw 36 fixed to the switch blade 25. The screw 36 projects through an aperture in the contact finger 33 to prevent its accidental displacement. The contact member 34 is rigidly supported upon a base member 37 attached to an insulating foundation 38 fixed to the back wall of the casing, and is electrically connected through the blowout coil 39 with the binding post 40 which is connected by the conductor 41 with the source of electric supply.

When the switch blade 25 is moved to its closed circuit position the contact members 33 and 34 are firmly pressed together by the spring 35 to form an electrical connection between the conductors 30 and 41. When the blade 25 is released, the spring 31 moves it to its open circuit position, thereby separating the contact members 33 and 34 to disconnect said conductors. The blowout coil 39 is so positioned relative to the contact members 33 and 34 that the magnetic field produced thereby will immediately extinguish any arc formed between said contact members in the manner well understood in the art. The hubs 21 and fingers 23 are so disposed upon the shaft 14 that when said shaft is rotated from the off, towards the running position, the switches 1, 2, 3, 4, and 5 will be successively closed for a purpose which will hereinafter appear.

Attached to the insulating foundation 27 is an electro-magnet 42, the conductor 43 of which extends at one end to the binding post 40 and is directly connected with the source of electric supply, while at the other end said conductor is connected with a binding post 44. The magnet 42 has a core 45 which is so disposed that it will contact with the switch blade 25 when said blade is in its closed circuit position. The blade 25 is magnetically susceptible and will be attracted by the magnet core 45, said magnet being of such proportions that when actuated it will have sufficient attractive strength to hold the switch blade in closed position, but will not be able to move said blade from the open circuit position.

Figure 2:
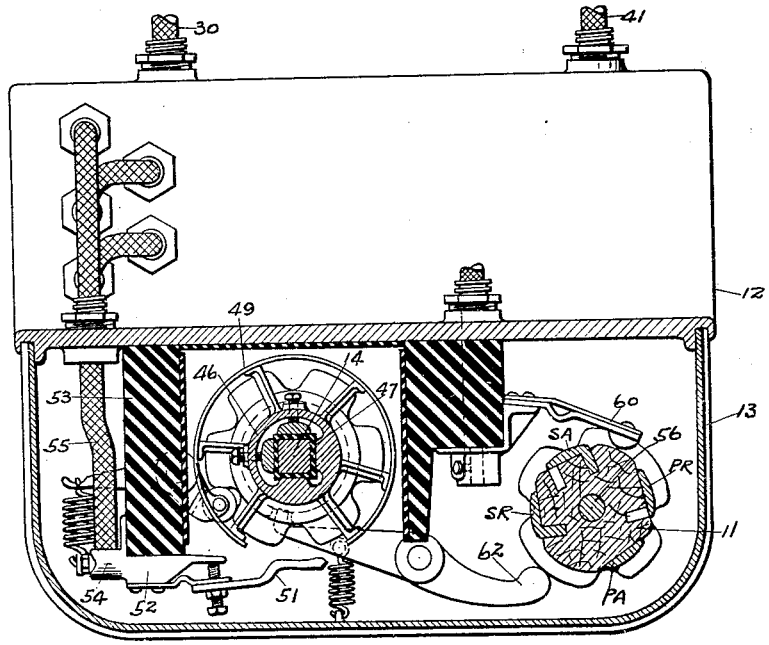
Fig. 2 is a cross sectional view taken along the line II—II of Fig. 1.

The supplemental switches 6, 7, 8, 9, and 10 being alike, a description of one will apply to all. As particularly shown on Fig. 2 there is mounted upon the shaft 14 a plurality of spiders 46, one for each of said supplemental switches, which are insulated from said shaft by a suitable insulating sleeve 47, and from each other by the insulating washers 48. Each of the spiders 46 carries a contact segment 49 adapted to cooperate with a pair of contact brushes 50 and 51 to close an electric circuit. The brushes 50 and 51 are resiliently attached to supporting bases 52 mounted upon an insulating foundation 53, and each is provided with a suitable binding post 54 by which it is connected with the conductors of the locomotive wiring system. One of the brushes 50 of each pair is connected directly with the ground, while the brush 51 is connected by the conductor 55 through the binding post 44 with the electromagnet 42 in such manner that when the circuit is closed between the brushes 50 and 51 of any pair, current will flow through the corresponding electromagnet to energize its core.

The reverse switch mechanism is of the type well known in the art which comprises a wooden cylinder 11 mounted upon a suitable shaft 56 which is journaled in bearings 57 and 58 of the casing, and is provided with a suitable operating handle 59 convenient to the hand of the operator. Upon the cylinder 11 are fixed four longitudinal rows of contact plates *pa*, *pr*, *sa*, and *sr*, adapted to cooperate with the brushes 60 to connect the conductors of the locomotive wiring system into appropriate circuits to control the direction of travel of the locomotive. Interlocking devices 61 cooperating with the reverse cylinder 11 and the shaft 14, prevent the rotation of either shaft while the other is in such position as to form undesirable combinations of circuits. As these devices are all well understood in the art, and as they form no part in the present invention, further description is not thought to be required at this time.

In Fig. 4 there is shown a diagram of the electric circuits of a locomotive having two motors 62 and 63 and equipped with the devices of my invention. As here illustrated electric current is derived from the trolley wire 64 through the trolley pole 65 which is connected with a trunk conductor 66. From the trunk conductor 66 there extends branch conductors 41 to the binding posts 40 of each switch of the controller, and, as the shaft 14 is rotated in clockwise direction from the off position towards the running position, the switches 5, 4, 3, 2 and 1 are progressively closed to connect the motors 26 and 63 with the source of electric supply. At the same time the supplemental switches 10, 9, 8, 7 and 6, are progressively closed, to send current through the electro-magnets 42 of the respective switches in the order in which they are closed, to hold the blades 25 in their closed circuit position. By the progressive closure of the switches 5, 4, 3, 2 and 1, the motors 62 and 63 are connected with the source of electric supply through a progressively decreasing portion of the resistance until, by the closure of the switch 1, all of said resistance is excluded from the circuit. The proportions of the parts are such that as the shaft 14 is rotated in the reverse, or anticlockwise direction, the contact segments 49 retain their connection with the brushes 50 and 51 until the fingers 23 have passed beyond the cam surfaces 24, thereby insuring quick brake between the members 33 and 34, and preventing the possibility of the retardation of their opening movement by the improper manipulation of the handle 15.

What I claim is:—

1. In a device of the class described, a plurality of movable circuit closing elements, movable control means operable on said elements in succession for moving the latter into circuit closing position, and means associated with each of said circuit closing elements and made successively operable in dependence upon the movement of said control means for engaging said elements in the closed position and releasing them upon another movement of said control means.

2. In a device of the class described, a plurality of movable circuit closing elements, movable control means operable on said elements in succession for moving the latter into circuit closing position, and means associated with each of said circuit closing elements and made successively operable in dependence upon the movement of said control means for engaging said elements in the closed position and releasing them upon the return movement of said control means.

3. In a device of the class described, a plurality of movable circuit closing elements, control means rotatable for moving said elements in succession into circuit closing position, and means associated with each of said circuit closing elements and made successively operable in dependence upon such rotation of said control means for engaging said elements in their closed position, and releasing them upon another movement of said control means.

4. In a controller of the class described, the combination with a pivotally mounted magnetically susceptible arm, of a yielding contact member carried by said arm adapted to cooperate with a corresponding member to close an electric circuit, positively acting means to move said arm into position to close said circuit, an electromagnet adapted to hold said arm in closed circuit position, automatically acting means tending to maintain said arm in open position, and a switch controlled by movement of said closing means to connect said electro-magnet with a source of current supply.

5. In a controller of the class described, the combination with a pivotally mounted magnetically susceptible arm, of an independent yielding contact member carried by said arm adapted to cooperate with a corresponding member to close an electric circuit, positively acting means to move said arm into position to close said circuit, an electro-magnet adapted to hold said arm in closed circuit position, automatically acting means tending to maintain said arm in the open circuit position, and a switch controlled by movement of said closing means to cause the excitation of said electro-magnet.

6. In a controller of the class described, the combination with a plurality of pivotally mounted magnetically susceptible arms, of a contact member carried by each arm adapted to cooperate with a corresponding member to close an electric circuit, positively acting means to successively move said arms into position to close their respective circuits, an electro-magnet adapted to hold each arm in closed circuit position, automatically acting means tending to maintain said arms in open circuit position, and a plurality of switches controlled by said closing means to control the excitation of said electro-magnets.

7. In a controller of the class described, the combination with a plurality of circuit closing switches, a shaft, rotatably mounted adjacent said switches, devices mounted upon said shaft adapted by its rotation to successively close said switches, separate means associated with each switch and independent of said closing means to hold said switches in closed position, automatically acting means tending to maintain said switches in their open position, and means made effective by the reverse rotation of said shaft to release said holding means in succession.

8. In a controller of the class described, the combination with a plurality of circuit closing switches, a shaft rotatably mounted adjacent said switches, devices mounted upon said shaft adapted by its rotation to successively close said switches, separate electromagnetic means associated with each switch to hold said switches in closed position, automatically acting means tending to maintain said switches in their open position, and means made effective by the reverse rotation of said shaft to release said holding means in succession.

9. In a controller of the class described, the combination with a plurality of pivotally mounted magnetically susceptible arms, of a contact member carried by each arm adapted to cooperate with a corresponding member to close an electric circuit, a shaft rotatably mounted adjacent said arms, devices upon said shaft adapted by its rotation to successively move said arms into position to close their respective circuits, an electro-magnet adapted to hold each arm in closed circuit position, automatically acting means tending to maintain said arms in open circuit position and a plurality of switches controlled by the rotation of said shaft to control the excitation of said electro-magnets.

10. In a controller of the class described, the combination of a plurality of pivotally mounted magnetically susceptible arms, of a contact member carried by each arm adapted to cooperate with a corresponding member to close an electric circuit, a shaft rotatably mounted adjacent said arms, devices upon said shaft adapted by its rotation to successively move said arms into position to close their respective circuits, an electro-magnet adapted to hold each arm in closed circuit position, automatically acting means tending to maintain said arms in open circuit position, and a plurality of contact segments carried by said shaft and adapted to cooperate with suitably positioned brushes to control the excitation of said electro-magnets.

11. In a controller of the class described, the combination with a pivotally mounted switch blade, automatically acting means tending to maintain said blade in its open position, a rotatable shaft mounted adjacent said blade, a cam mounted upon said shaft and adapted by its rotation to engage and move said blade into closed position, an electro-magnet arranged to hold said blade in closed position, a switch comprising a contact segment mounted upon said shaft and two contact fingers in position to contact with said segment to complete a circuit which includes said electro-magnet as and for the purpose set forth.

12. In a device of the class described, a plurality of movable circuit closing elements, control means rotatable for moving said elements in succession into circuit closing position, and means associated with each of said circuit closing elements and made successively operable in dependence upon such rotation of said control means for engaging said elements in their closed position, and releasing them upon the return movement of said control means.

13. In a device of the class described, a plurality of movable circuit closing elements, control means rotatable for moving said elements in succession into circuit closing position, an electro-magnet operable upon each of said elements, a circuit for each of said magnets, and means operable in dependence upon the movement of said control means for closing said circuits in like succession with said circuit closing elements, and opening said circuits upon another movement of said control means.

14. In a device of the class described, a plurality of movable circuit closing elements, control means rotatable for moving said elements in succession into circuit closing position, an electro-magnet operable upon each of said elements, a circuit for each of said magnets, and means operable in dependence upon the movement of said control means for closing said circuits in like succession with said circuit closing elements, and opening said circuits upon the return movement of said control means.

15. In a device of the class described, a plurality of normally open circuit closing elements, positive means to close said elements successively, electro-magnetic holding means successively energized correlatively with the closing of said elements to hold the latter in closed position, said holding means being successively de-energized subsequent to the respective release of said elements by said positive means.

In testimony whereof I have hereunto set my hand.

ROBERT R. DUNLOP.